United States Patent [19]

Sundermann et al.

[11] Patent Number: 4,664,623
[45] Date of Patent: May 12, 1987

[54] PROCESS AND APPARATUS FOR THE THERMAL TREATMENT OF TRICKLING MATERIAL SWELLABLE OR RENDERED SWELLABLE, AND CONTAINING ALUMINOSILICATES

[75] Inventors: Erich Sundermann; Hanno Laurien; Wolfgang Vahlbrauk, all of Braunschweig; Hans Reye, Neustadt, all of Fed. Rep. of Germany

[73] Assignee: Perfluktiv-Consult AG, Basel, Switzerland

[21] Appl. No.: 810,331

[22] PCT Filed: Mar. 16, 1985

[86] PCT No.: PCT/EP85/00112
§ 371 Date: Nov. 22, 1985
§ 102(e) Date: Nov. 22, 1985

[87] PCT Pub. No.: WO85/04468
PCT Pub. Date: Oct. 10, 1985

[30] Foreign Application Priority Data

Mar. 24, 1984 [DE] Fed. Rep. of Germany ....... 3410897

[51] Int. Cl.[4] .......................................... F27B 15/00
[52] U.S. Cl. .................................... 432/14; 432/98; 432/13; 252/378 P
[58] Field of Search ................. 432/13, 14, 95, 97, 432/98, 99, 100; 252/378, 378 P

[56] References Cited

U.S. PATENT DOCUMENTS 2,451,024 10/1948 Ellerbeck .............................. 432/98
3,030,090 4/1962 Johnson, Jr. ......................... 432/13

FOREIGN PATENT DOCUMENTS 848172 9/1952 Fed. Rep. of Germany .
1054004 3/1959 Fed. Rep. of Germany .
1243827 7/1967 Fed. Rep. of Germany .
1471380 1/1969 Fed. Rep. of Germany .
1139777 11/1955 France .
1424099 11/1965 France .
157194 1/1921 United Kingdom .

OTHER PUBLICATIONS

Dr. W. Schellmann, H. Fastabend, *Die Ziegelindustrie*, 1963, No. 24, pp. 899–905.
K. Briem et al., *Keramische Zeitschrift*, yr. 31, No. 5, 1979, pp. 292–294.

*Primary Examiner*—Henry C. Yuen
*Attorney, Agent, or Firm*—Karl F. Ross; Herbert Dubno

[57] ABSTRACT

In the thermal process for treating swellable granulates of clay or the like, the granulates are entered in heaps (4) with free intervals between them into a shaft (1) and traverse said shaft (1) by stages from top to bottom. The heaps (4) are supported by grates (2) of which the bars may be temporarily and at least taken out from the plane of the grate (2) so that the various heaps (4) are fed in the form of a temporarily regulated trickling flow to the next stage, so that a constant thickness with respect to the cross-section is maintained. In the various stages, the heaps (4) are traversed by hot gases introduced sideways into the shaft (1) and exhausted on the other side according to a direction perpendicular to the plane of the layer. In the upper stages of the shaft a preheating is carried out, while, at least in the lower stages, a pre-swelling of the granulates is effected with gases at different temperatures and a chemical combination with advantageous thermal transfer and high fluid mechanics efficiency.

10 Claims, 12 Drawing Figures

PROCESS AND APPARATUS FOR THE THERMAL TREATMENT OF TRICKLING MATERIAL SWELLABLE OR RENDERED SWELLABLE, AND CONTAINING ALUMINOSILICATES

CROSS REFERENCE TO RELATED APPLICATION

This application is a national phase application corresponding to PCT/EP85/00112 filed Mar. 16, 1985 and based upon a German national application P 34 10897.1 of Mar. 24, 1984 under the International Convention.

FIELD OF THE INVENTION

The invention relates to a process and an apparatus for the thermal treatment of material capable of trickling, swellable or capable of being rendered swellable, containing aluminosilicate, as granular material, in piles, where the piles, in a plurality separated in tiers above one another, and with retention of free space from pile to pile, are placed in a shaft and transported through the shaft after predetermined dwell periods in the several tiers, from top to bottom, starting with the lowermost pile or piles through the discharge, and where the material is acted upon during the dwell periods by hot gases introduced into the free interstices.

BACKGROUND OF THE INVENTION

It is known how to process porous refractories made of swellable material in the manner described above (DE-AS No. 11 65 477). For this purpose, the material to be processed and broken up into the desired pellet size, such as clay or oil shale, is placed into chambers arrayed above one another of a shaft, where each chamber is filled partially only, so that a free interspace remains between a pile present in any one chamber, and the bottom of the next higher consisting of segments rotatable about the longitudinal axis, into which free space burning gases produced by burners arranged laterally in the walls of the shaft are introduced. To avoid clumping of the material, a mechanical loosening of the granular material is effected by the bottoms being driven rotarionally, and their being equipped with teeth pointing downwards and reaching into the proximity of the next bottom.

It has further become known DE AS No. 12 43 827 how to arrange burner chambers on both sides of the shaft, and to connect these with the interior of the shaft by means of passages in the wall of the shaft, where the interior of the shaft is again subdivided into chambers by means of bottoms consisting of rotatable segments. By suitable control of the bottom segments of the individual chambers and the use of a feed device sreening the two burner chambers alternately, the material dropping from chamber shall be blown at alternately, set into turbulent motion, and thus a cross flow heating of the material shall be accomplished.

In the known process, only a relatively low utilization of the energy of the burning gases it attained, since in the first case the burning gases are transmitted only to the pertinent chamber bottoms and onto the surfaces of the granular material to be treated facing the interstices, while in the second case the heating of the material occurs practically exclusively during the short time of the free fall of the material from chamber bottom to chamber bottom. This poor utilization of the energy of the burning gases requires of necessity that a multiplicity of chambers arrayed above one another must be provided in the shaft, because the temperature of the heating and burning gases cannot be too high, so as not to initiate the swelling process in the exterior zones before a sufficient heating in the interior of the several material particles has taken place.

OBJECT OF THE INVENTION

The object of the invention is to provide a process (and apparatus) of the kind mentioned in the introduction in such manner that a thermal treatment of short duration and even distribution of all material particles contained in a pile is achieved, and where different temperature settings and the processing of the material with gases of differents composition is made possible during the dwell periods in the different tiers.

SUMMARY OF THE INVENTION

The object is attained in accordance with the invention in such manner that the material, before being fed into the shaft, is formed into pellets of approximately uniform size with longitudinal and lateral dimensions in the range from 6 to 26 mm, dried at temperatures of up to 360° C., premetered according to the pertinent pile volume, and distributed evenly in such manner over an area corresponding to the cross sectional area of the shaft that the piles are formed with a layer thickness uniform throughout their cross section and that the piles in the shaft are supported by grates as required, that during the several successive dwell periods on the several grates the piles are penetrated in a direction perpendicular to the plane of the layer by the hot gases induced into the free spaces between neighboring piles but exhausted from other in-between spaces, that the pellets during several dwell periods are preheated by gases below the swell temperature of the material in question and subsequently during at least one further dwell period are preswelled at a gas temperature above the preswell temperature of the material in question and are carried further in preswelled condition in pile batches towards further treatment, where the piles after the pertinent dwell period on the grates are loosened by timed movement of at least a portion of the grate rods out of the plane of the grate, and the pellets are brought to the subsequent grate in form of a trickle stream largely uniform over the cross sectional area of the pile so that they again from piles with a layer thickness uniform over their cross section.

For the achievement of a uniform treatment of the pellets it is to start with, necessary to produce these in approximately uniform size, and to dry them, where they may have the shape of spheres, but are usually produced as cylinder-shaped particales, which in length should not exceed the above mentioned dimensions of 26 mm, while their diameter is generally smaller. It is further important for the uniform treatment of all pellets that these form piles of uniform remaining layer thickness in the several tiers, where due to the said structure of the pellets sufficient interstices remain, which make it possible to direct the heating gases through the pile so that they flow uniformly around all pellets contained in a pile, and by means of turbulence in the interstices cause a further improvement in the heat transfer.

Due to the fact that the induced hot gases are introduced on one side of the shaft into the spaces between adjacent piles, and are exhausted again on the opposite side, the piles in the several tiers or also groups of tiers can be acted upon by heating gases of different temperatures or different chemical composition and different stream velocity, respectively. The number of piles and their treatment period on the grates can be determined individually according to raw material and purpose of treatment, thus attaining a treatment procedure attuned to the material in question.

The arrangement of the piles on the grates in the several tiers not only facilitates a penetration of the piles in the longitudinal axis of the shaft, but at the same time by means of suitable controlled movement of at least a portion of the grate rods out of the plane of the grate a suitable trickle stream favoring the formation of the uniform layer in the subsequent tier is attained. Thereby, the desired trickle motion can be produced either by lowering or by raising a portion of the grate rods, where the lifting paths or heights, respectively, and the positioning of the grate rods in two or three different planes depending on the material being treated and the shape of the pellets, can be adjusted according to prevailing conditions, where the most favorable results can be determined through corresponding trickling experiments. As a rule, the trickle time is 2 to 4 seconds per pile.

Since the distance of fall for the material can be held comparatively small, there results only small mechanical stressing of the material, as opposed to the treatment in rotating kilns, handling for preswelling.

To charge the shaft, the pellets can be metered outside the shaft, and when being transferred into the shaft can be distribued on the topmost tier while forming a pile with layer thickness uniform over the cross section. Thereby it will be appropriate that at least the pile topmost in the shaft will be screened against penetration by hot gases. In this manner, the pile topmost in the shaft contributes to the screening of the interior of the shaft.

It will be advantageous the piles during certain dwell periods, are penetrated by the hot gases in one direction, and during other dwell periods in the opposite direction. This is, for example, possible in a particularly simple manner when the hot gases fed into one chamber, are exhausted from both adjacent chambers after penetration of the piles, or vice versa, so that for example the pile initially penetrated from botton to top, is after transfer into the next chamber penetrated by the same gas stream from top to bottom, without a reversal of the direction of flow of the hot gases being necessary in said chambers.

By means of the reversal of the direction of flow it is quite possible and in many cases advatagous to let the piles be penetrated alternately in opposite direction during some dwell periods. By penetration of the piles in opposite direction, there will be achieved, as a function of the layer thickness of the piles, a uniform heating of the pellets without local overheating.

It has been found that, all else being equal, the requirement for heating energy for alternating penetration of a batch, which may be desired for the purpose of temperature equalization in the material, is less than the requirement for heating energy for one-sided convective heating.

In order to retain the advantage of unidirectional penetration for the procedure in which the gases enter the shaft-type enclosure in every other space between piles, and exit from the next space, the direction of the gas stream is reversed during the interval during which the material falls to the next stage.

By means of the reversal of the direction of the gas stream, in the procedure described the advantagous one-sided penetration of the gases of every single batch is maintained during the entire stay in the shaft.

It is advantagous that the piles are penetrated during preheating by a hot neutral or reducing gas, and during preswelling by an oxidizing gas. By means of neutral or oxidizing gases the swell temperature of the pellets is shifted upward, while oxidizing gases favor the swelling of the pellets at lower temperatures.

For the production of plate or block shaped structural elements we apportion the pellets in a thickness correponding to the structural elements, so that the several preswelled piles can be processed further without addition or subtraction of material, where they are, for instance, fed to a device for coalescent swelling.

The new procedure offers a special advantage in that it makes possible the porduction of layered material of preswelled pellets in a particularly simple manner. For this purpose, that is for the production of layered structural elements, it will be advanatageous to apportion the pellets of each layer in a quantity corresponding to each layer thickness, and after completion of the preswelling to bring together the piles in the desired layering, and convey them to further processing. In this manner it is, for example, possible to produce structural elements in the shape of plates or blocks, which are monolithic composites, whose one layer may for example exhibit extraordinarily high thermal insulation, while the other layer, as loadcarrying layer, may exhibit a perticularly high compressive strength.

In order to avoid irregular flow through the piles due to accidental locally dense packing of the pellets, and to achieve a dissolution of these dense packings, which otherwise occurs only during the subsequent transfer of the pile into the next lower tier due to the liftable and lowerable grate rods which counteract the formation of bridges, it may be appropriate to expose the piles during flow from below to a gas stream of such intensity that the loosening point is reached, or just exceeded.

During the preswelling of the pellets, which occurs towards the end of the treatment of the piles, there is a special danger of clumping of the pellets since during preswelling the latter reach on the surface the fusible stage. To avoid clumping and formation of bridges in this instance, it will be advantageous that during preswelling of the pellets the piles are shielded partially, form place to place at least during some dwell periods, against penetration by the gases, and in other areas are penetrated up to and beyond the point of loosening. Thereby a partial relayering of the pellets from the partially penetrated into the non-penetrated area is achieved, where due to the local change of partial penetration a partial reversal of prelayered pellets is achieved again and again.

In a practical execution of the process, it has been found to be advantagous that the piles on their path through the shaft are shielded against penetration by the hot gases during the first or first two dwell periods, while during a subsequent series, particularly between four to ten dwell periods, they are penetrated by a neutral or reducing gas of a temperature just below the preswell temperature, specifically in opposite direction with each dwell period, and that during the last dwell period the piles are penetrated by an oxidizing gas of a temperature above the preswell temperature of the pellets. The duration of the dwell periods of the piles in the several levels amounts in actual practice to a few minutes, depending on the layer thickness of the piles, and their volume of voids. The stream velocity of the hot gas at the intercept area of the piles is in the order of magnitude of from 0.5 to 4 meters per second.

In practical application of the procedure, the temperatue of the hot gases lie in the order of magnitude of 800° C. during the first dwell periods of preheating, while during the preswell phase the temperature of the heating gas lies above 1000° C., but must be adjusted in all phases to the composition of the material, and its capability of being swelled.

During the processing of pellets as intermediate products for the manufacture of furnace lining and similar, gas temperatures of up to 1600° C. may be required, since the material being processed must already be brought up to temperatures of above 1500° C.

Apparatus for the execution of the process is based on a shaft, whose interior is subdivided into chambers for the reception of the material by means of intermediary bottoms which exhibit adjustable floor elements for the batch-wise transportation of the material through the shaft, and in the shaft walls free passage opening to the chambers. In the sense of the invention, this apparatus is characterized by the fact that above the upper portion of the shaft, means are provided for the even distribution of the premetered material over the cross section of the shaft upon a grate forming the floor of a distribution chamber, that the intermediate floors forming the chambers likewise consist of grates, and that all grates consist at least partly of movable grate rods with actuating means for the temporary and timed enlargement of the free interstices between adjacent grate rods by moving a part of the grate rods out of the plane of the grate, and that the passages in the shaft walls are connected to gas feed and exhaust lines and attendant control means.

The above mentioned shaft, which in the embodiment described has its own significance as an invention, is suitable not only for the preheating and preswelling of material containing aluminosilicate, such as expandable clay and similar, but in the embodiment described it can also be used for the predrying of these pellets where in comparison with the process described above in detail only the temperature levels and if required by the preheat and preswell process a different sequence of the direction of penetration of the piles may be chosen.

In case of utilization of the shaft for the drying process the structural parts coming in contact with the hot gases can consist of materials less heat resistant, since the drying temperatures lie significantly lower than the preheat and preswell temperatures. When utilizing the shaft for the preheating and preswelling, then at least the grates of the preswell zone and the load bearing parts of the grates of the preswell zone which come into contact with the hot gases in the preswell zone must consist of a suitable high-heat resistant material. As material for this purpose, SiSiC has proven itself for temperatures up to 1350° C., and reaction sintered SiC for temperatures up to 1600° C.

In order to effect, as already described above, the penetration of two adjacent piles, or even more than two piles, by one and the same gas stream supplied, expedient to combine the passages in the shaft at least in thearea of the preheat zone for the introduction of the hot gases and their exhaust in groups, and to connect them to the feed and exhaust lines. The expenditure for feed and exhaust lines is thereby reduced considerable, and furthermore the disposition of the gases of different temperature and varying chemical composition can be a circular one, in order to keep down the energy requirements for the material in the shaft in a known manner. In a known manner, heat exchangers and regenerators can be provided in the circulation path of the hot gases, as they are likewise used in other layouts for similar thermal treatment.

The arrangement and configuration of the grate rods is effected in a manner that the movable grate rods of any one grate, by means of interconnection of their ends, constitute a module, which can be moved out of the plane of the fixed grate rods by means of actuating devices. Thereby, the positioning of the grate rods in two or three planes as already described is possible, in order to secure, as required by the shape and size of the granular material and of the grate rods, the transfer of the piles from tier to tier with the pile thickness remaining constant over the entire cross section of the shaft. By means of a lifting device, the modules formed by the movable grate rods can thereby suitable lowered into a plane below the plane of the fixed grate rods, or returned into the plane of the fixed grate rods. Instead of a lowering of the modules, a raising of the modules can also be provided for, but as a rule lowering is more suitable if the material does not have too much of a tendency to bridge formation.

Further details of the construction and actuation of the grate rods or the modules formed by the grate rods result from the subclaims, in which are described the various possiblities of constration of the shaft of ring-shaped closed modules, each with one grate and passages in the walls for feed and exhaust of the gases, and construction of the grates as modules which can be slid into place sideways through closable window openings in the shaft walls.

In order to prevent a closing of the voids between the grates by the pellets with certainty, special measures are necessary so that aligned position of the pellets, especially where these pellets are made cylindrical in cross section, is avoided. For this purpose, the invention provides that the grate rods, as seen in cross section, exhibit in their upper portion an undercut profile, and that they are equipped with interchangeable slideable rider-shaped profile sections, which are suitable horseshoe-shaped, with protrusions in the longitudianl direction of the grate rods, constructed as stops for adjacent profile sections.

In order to avoid the possible formation of bridges as described above due to clumping of the material, especially during the preswell process, and to attain a loosening or partial relayering of the pellets, it is particularly advantagous to provide, below the grates where the pellets are preswelled, a grid-shaped insert for the formation of parallel stream channels, and that flaps rotatable about horizontal axes are provided in the stream channels, which, corresponding to the squares of a chess board, can be positioned alternately or in groups into the place of the shaft, or perpendicular thereto. In order to make it possible to actuate the flaps in groups it will be advantageous to provide for each row of flaps two horizontal axles disposed above one another for the alternating arrangement of the flaps.

Finally, it will be suitable for separation of the several gas streams and for the closing off of the shaft below the topmost grate if in the places mentioned there is provided between two adjacent grates a partition made up of swingeable segments which can be placed into open or closed position by motion of the segments.

BRIEF DESCRIPTION OF THE DRAWINGS

The drawing represents in schematic form embodiment of apparatus for carrying out the process.

In the drawing:

FIG. 2b is a top view of the arrangement according to FIG. 2a;

SPECIFIC DESCRIPTION

Figure 1:
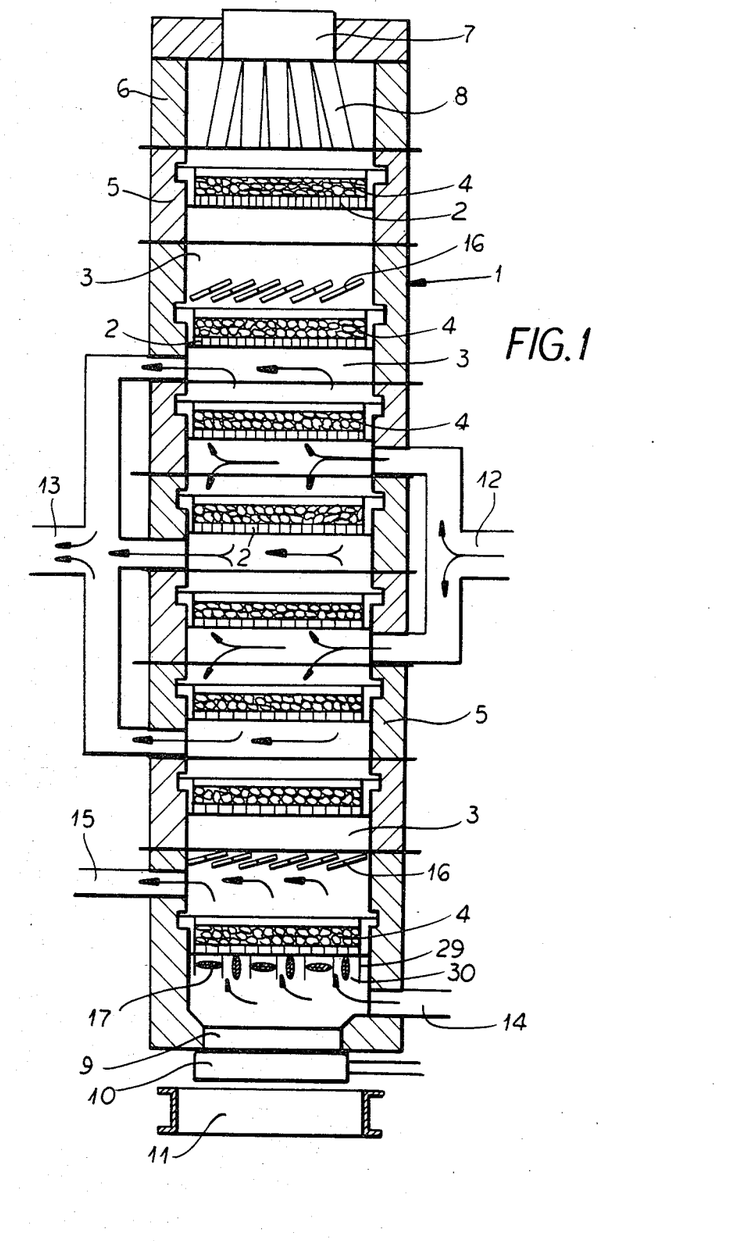
FIG. 1 is a longitudinal section through a shaft for the preswelling predried granulates of a material containing aluminosilicate, such as clay.

The shaft shown in FIG. 1 exhibits walls designated generally as 1 and can exhibit either a square or a rectangular cross section. In the shaft are at intervals above one another in the walls grates 2 at distances from one another so that between adjacent grates 2 chambers 3 are created, which are partially filled by level piles 4 of pellets which consist of a material containing aluminosilicate, such as clay or similar.

The shaft shown serves for the preheating and preswelling of the pellets contained in the piles. On its upper end the shaft, which in the example shown is composed of module sections 5 closed in ring shape, each with a grate 2 contained therein, is closed by a closure housing 6, in which are arranged a metering device 7 and thereunder a distribution device 8 for the material to be fed to the topmost grate. Each time the quantity of pellets required for one pile 4 is withdrawn from a supply not shown, and taken up by a feed device before the pellets are conveyed to the topmost grate 2 by said distribution device 8.

On its lower end the shaft is equipped with a slider 10 which opens or closes the discharge opening 9 as chosen, which is arrayed above a form 11 into which the pile 4 processed on the lowermost grate 2 is conveyed after completion of processing in free fall (mode).

Passages are provided in the wall 1 of the shaft which are connected to the gas feed and exhaust lines respectively 12, 13, 14 and 15 respectively. The said lines are in turn connected to transport blowers and heating devices for the gases to be conducted into the shaft via control means. To the said control means belong as a rule such other which permit the reversal of the stream direction if required.

In the shaft shown according to FIG. 1, a partition is provided between the two topmost grates 2 or the topmost chambers 3 respectively which consists of vanes 16 and can be placed into the open or closed postion by adjustment of the vanes. A similar partition of vanes 16 is provided between the lowest chamber in the shaft which at the same time froms the discharge chamber, and the chamber above it.

Finally, below the grate lowermost in the shaft, the arrangement of a gridshaped insert 29 can be discerned, which serves for the formation of parallel stream channels 30, in which flaps 17 are arrayed which are rotatable about a horizontal axis and assume partly a shutoff position and partly a passage position.

Figure 2A:
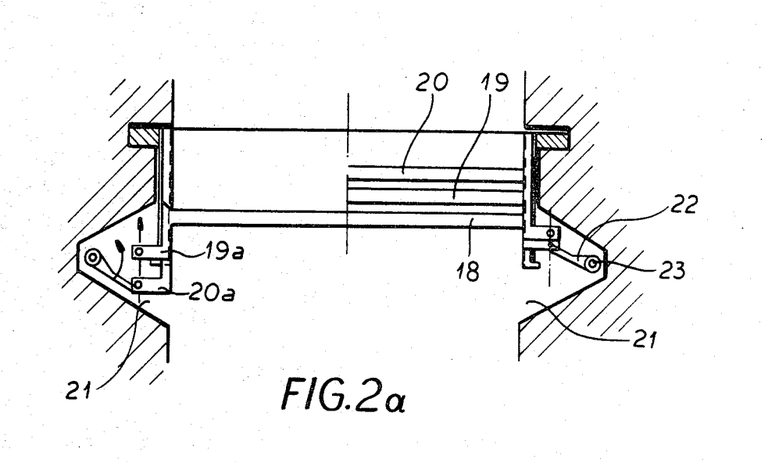
FIG. 2a is in enlarged representation, a portion of the sectional view to FIG. 1 at the level of a grate, in which details of the grate arrangement can be gleaned.
Figure 2B:
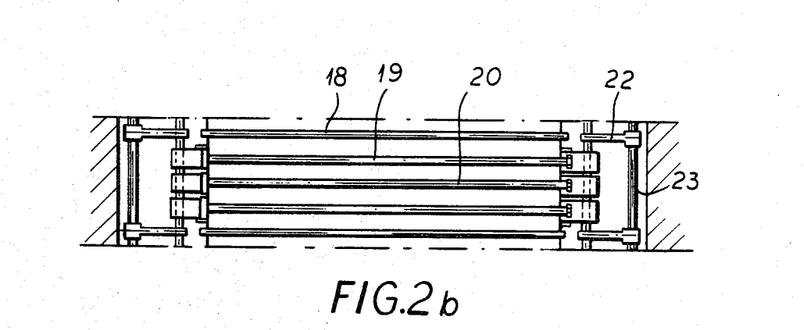

The grates arranged in the shaft consist according to FIG. 2a and 2b partly of fixed grate rods 18, and partly of movable grate rods 19 and 20, where the latter in the example shown in FIG. 2a and 2b are movable upwards out of the plane of the grate with respect to the fixed grate rods 18, in order to temporarily enlarge the free intervals between adjacent grate rods.

In the left part of FIG. 2 the position of grate rods 18 to 20 is shown in the plane of the grate, while in the right part grate rods 19 and 20 are shown in variously position with respect to the plane of the grate. Crank or swing arms 22 are provided in suitable recesses 21 on the inside of the shaft wall 1 to raise grate rods 19 and 20, which can be swung from the outside between the positions which are shown in the right and left part of FIG. 2a by means of an operating shaft 23. The movable grate rods 19 and 20 are made longer than the fixed grate rods and united in a raisable and lowerable module, where the extensions of the grate rods according to FIG. 2a exhibit crank ends 19a and 20a of different lenths. This has the result that due to a pivoting action of the crank arms 22 about the pivot shaft actuatable from the outside of the shaft be means of a pivot drive, the grate rods 19 and 20 are positioned in different heights, as revealed in the right half of FIG. 2a.

Figure 3A:
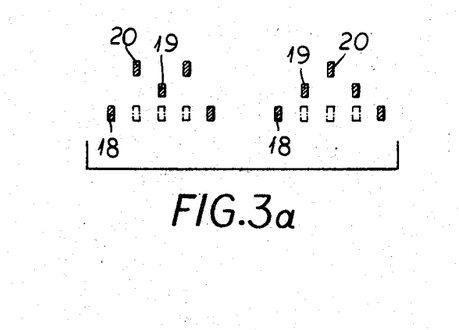
FIG. 3a shows possible positions of the grate rods in their arrangement.
Figure 3B:
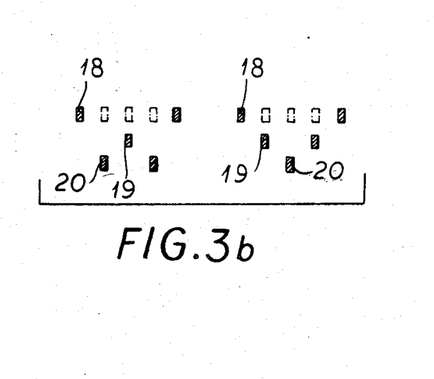
FIG. 3b a construction according to FIG. 2a and 2b.

Depending on the arrangement and configuration of the grate rods, there result in the raised position the different possible relative positions of the rods shown in the right and left half of FIG. 3a and 3b, depending on whether a motion of the movable grate rods 19 and 20 leads into the raised position, or whether in reverse a lowering of the grate rods is provided.

By means of a controllable drive for the actuating shaft 23 of the crank arms 22, a variable, timed transposition of the grate rods 19 and 20 into their several positions can result.

Figure 4:
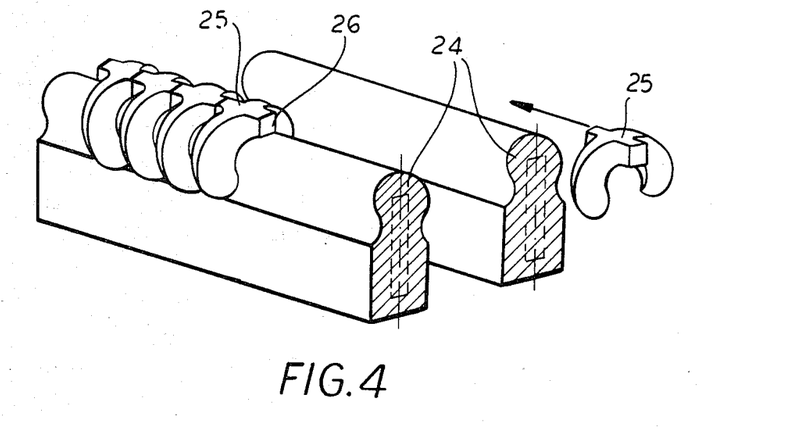
FIG. 4 is a perspective representation of two grate rods with partially assembled rider-shaped profile sections.
Figure 5:
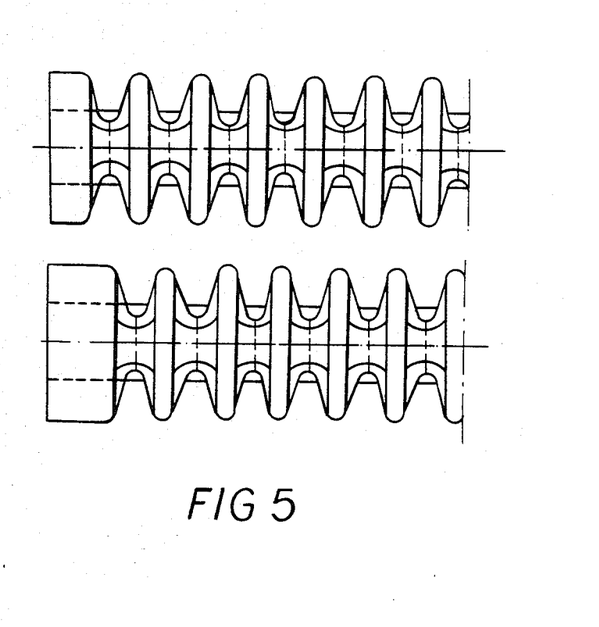
FIG. 5 is a partial top view of the grate rods according to FIG. 4, with profile sections assembled thereon

The grate rods shown in FIG. 2a and 2b schematically with respect to the configuration of their cross section exhibit in actual practice the shape reproduced in FIG. 4 and 5. One recognizes in said figures that the grate rods, which may be realized as solid or hollow profiles, exhibit, as seen in cross section, in their upper portion an undercut outline 24, and are equipped with slid-on interchangeable rider-shaped profiles 25, which are slid upon the grate rods. The rider-shaped profiles are made horse-shoe-shaped and are equipped with protrusions 26 pointing in the longitudinal direction of the grate rods as limit stops for adjacent rider-shaped profiles. With dense packing of the rider-shaped profiles upon the grate rods a shape for the grate rods results as can be seen in the top view of FIG. 7 of two adjacent crate rods. By utilization of riders of varying size upon the grate rods, the local resistance to stream flow can be influenced in the sense of equalization across the cross section of the shaft.

The rider shaped profiles have the effect that the in each pile 4 the lowermost stratum of the pellets can not close the spaces between adjacent grate rods, even when the pellets exhibit a cylindrical shape, due to which, without the rider shapes profiles, one has to reckon with a row-like disposition of the pellets in the interstices between the grate rods due to the rolling motion of the pellets.

Equipping the shaft shown in FIG. 1 with the elements described up to now, there results for this shaft, for the purpose of preheating and preswelling of the piles of pellets introduced into the shaft for the production of structural elements the following mode of operation:

Pile 4 lowermost in the shaft is penetrated in the range of the flow channels 30 uncovered by means of flaps 17 by introduction of hot oxidizing gases of a temperature of about 1100° C., where after passage the gas is exhausted by means of vanes provided above the lowermost pile 4 via gas exhaust line 15. The stream velocity of the gas against the pile lowermost in the shaft is in this case adjusted to a value of for example 4 meters per second due to which the loosening point of the pellets present in the pile is reached or exceeded, respectively, so that in the area above the penetrated channels 30 there results a partial movement of the pellets, and these, due to loosening and gas stream come into the range of those channels 30 which contain no gas streams. By a change in the position of the flaps 17 a return and reverse motion of the pellets is effected, so that due to the partial movement there need be no fear of pellets clumping even at attainment of the melting phase in the outer zones. Due to the hot gases penetrating the piles a uniform heating of all pellets of this pile occurs.

Pile 4 positioned above the lower pivoting vanes 16 forms an additional blocking layer to the vanes being in closed position and is not penetrated by hot gases. In contrast thereto, the four piles in vertical succession are penetrated partly from top to bottom, and partly from bottom to top, where these piles are associated with a common gas feed line 12 and a common gas exhaust line 13. In this zone of treatment the piles are acted upon by a reducing gas at a temperature between 800° and 1010° C., so that in this zone an appropriate prewarming of the pellets occurs, before they are exposed to the already described preswell treatment on the grate lowermost in the shaft.

The second pile from the top in the shat shown in FIG. 1 also forms a blocking layer, since above this pile a partition made up of pivoting vanes 16 is provided, which is in closed position during the penetration of the piles. Finally also, the pile uppermost in the shaft is not penetrated by hot gases either. This is impossible too due to the fact that the formation of this pile occurs first on the uppermost grate by the action of metering device 8, at a time when the other piles are being penetrated in the manner described.

When the pellets located on the lowest grate of that pile have attained the preswell state, the feeding of the hot gases by feed line 14 may, but need not be interrupted, but by means of repositioning of the movable grate rods of this grate into the open position, the pile is disolved, and while forming a trickle stream essentially uniform over the cross section area of the shaft and after opening of the lower slider 10 it is transferred into form 11. After completed return of the movable grate rods into the plane of the fixed grate rods the pivoting vances above this grate are swung into the open position, and by actuation of the grate rods of the grate located above these vances the pile located thereon is dissolved in the manner already described and is transferred onto the lowest grate in free fall in form of a uniform trickling stream.

This procedure repeats from grate to grate, until the grate uppermost in the shaft is free, so that with the vanes 16 positioned in the upper part of the shaft in closed position, the formation of a new pile takes place on the uppermost grate.

With pellets of longtudinal and lateral dimensions of about 16 mm, and a clear cross section of the shaft of 1200×1200 mm, the vertic dimensions of the piles are in actuality about 100 mm. The individual trickling times lie as a rule between 2 and 4 seconds per pile. Dwell periods are about 180 seconds per tier.

The flow of hot gases through the piles shown in FIG. 1 by means of several arrows can be changed in their direction even during the dwell period on individual grates be appropriate arrangement of reversing vanes or valves in the gas feed and exhaust lines as required.

Figure 6:
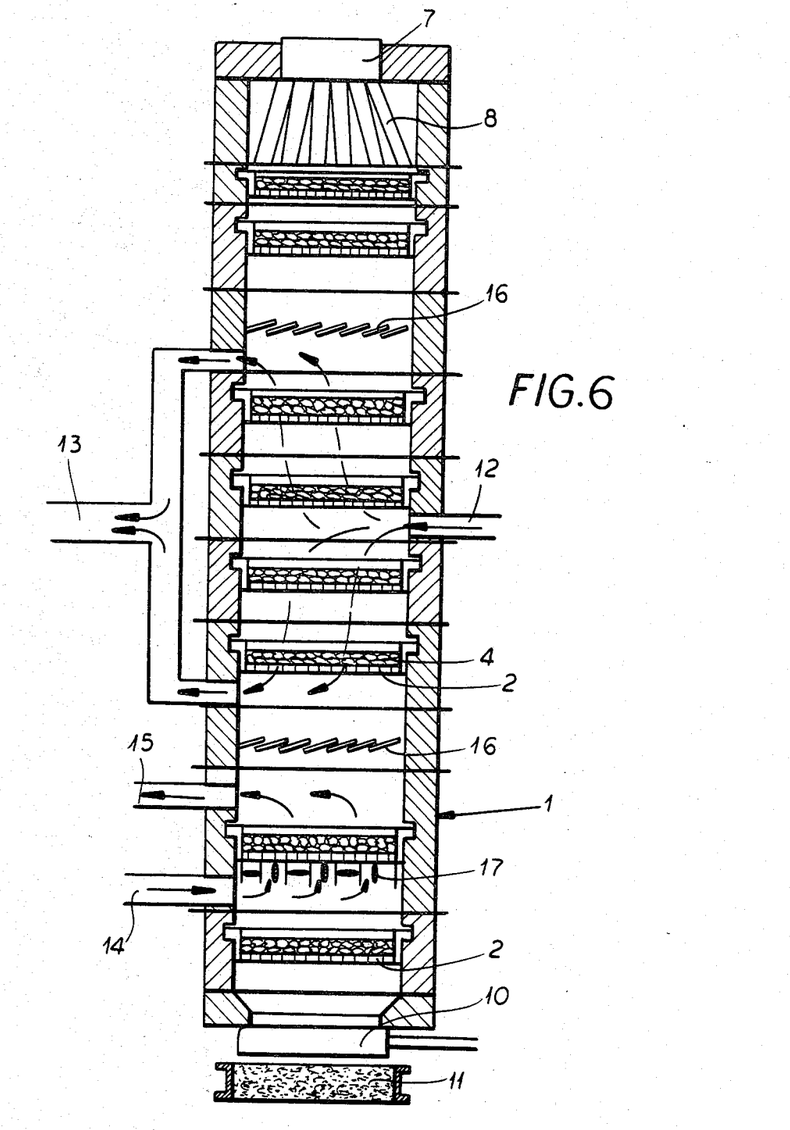
FIG. 6 is a longitudinal section through a shaft similar to FIG. 1, for the processing of granulates for the production of compound plates or blocks.

The arrangement of the shaft in accordance with FIG. 6 coresponds in its construction to the shaft according to FIG. 1, however, a somewhat different flow arrangement is provided, as the gas feed and exhaust lines 12 and 13 demonstrate in the range of the preheat zone, and 14 and 15 in the range of the preswell zone. In addition, there is located below the grate located between feed and exhaust lines 14 and 15 and the pile thereon a further grate with a pile located thereon as blocking layer, which has special significance for the production of compound plates of two or more different material in layer construction. For the production of such layered yet monolithic plates or blocks the piles of different materials are conveyed through the shaft in sequence of layers in the manner described, and at the discharge transferred into the form 11. For a compound material consisting of two layers it is advisable to let the already preswelled pile remain in the shaft, until the subsequent pile consisting of the other layer has reached the preswell state on the grate above the lowermost grate. The two lowest layers are then conveyed at short distances and in very short intervals into form 11 one after the other, so that they have practically the same temperature and can be conveyed together with the form for further processing, for example, in a furnace for the final sintering of the pellets.

Figure 7:
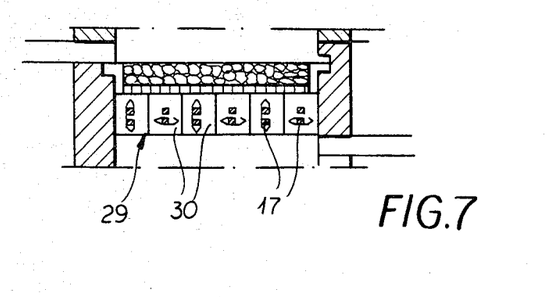
FIG. 7 is a partial longitudinal section through a shaft according to FIG. 1 and 6 in enlarged representation with the rotatable flaps provided below the grate.
Figure 8:
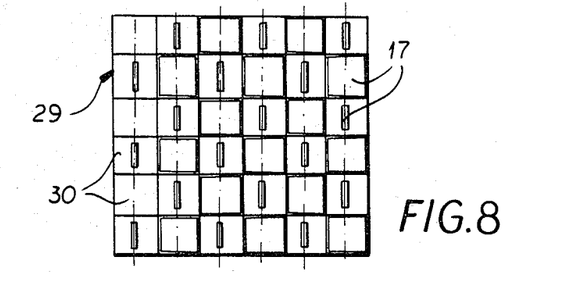
FIG. 8 is a view from below toward the flaps according to FIG. 7 distributed over the cross section of the shaft.
Figure 9:
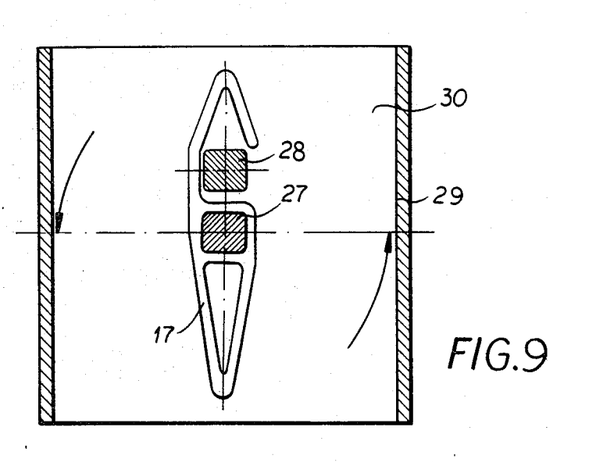
FIG. 9 is an enlarged cross section through one of the flaps according to FIG. 7 and 8.

The FIGS. 7 to 9 show details with regard to arrangement and construction of the flaps 17 which are rotatable about their horizontal axles. These flaps, as shown in FIGS. 7 and 8, are emplaced in the stream channels 30 of a grid-shaped insert 29 and are arranged in a manner of a chess board in such a manner that two adjacent flaps always assume different positions. To make it possible to actuate those flaps 17 of each row which assume the same position in unison, two horizontal axles 27 and 28, as shown in FIG. 9, arrayed above one another are provided, upon which the flaps 17 of each row are held. FIG. 9 shows the actual execution of flaps 17 and their arrangement upon the horizontal axles, where flap 17 is shown placed on axle 27, while in a recess it receives axle 28 of the respective adjacent flap, without axle 28 impeding the pivoting of flap 17 shown in the direction of the arrow shown. The flaps adjacent to flaps 17 shown are arranged on axle 28 displaced by 180° and in their recesses receive axle 27. By means of the arrangement described, it is possible to place all flaps into the closed position, or all flaps into the open position, and also to place adjacent flaps into different positions, as shown in FIG. 8.

The grid-shaped insert as well as the flaps 17 held therein and the load bearing axles 27 and 28 as well as grates 2 are manufactured of SiSiC or reaction sintered SiC, and suitably provided with a covering layer of boron nitride.

Figure 10:
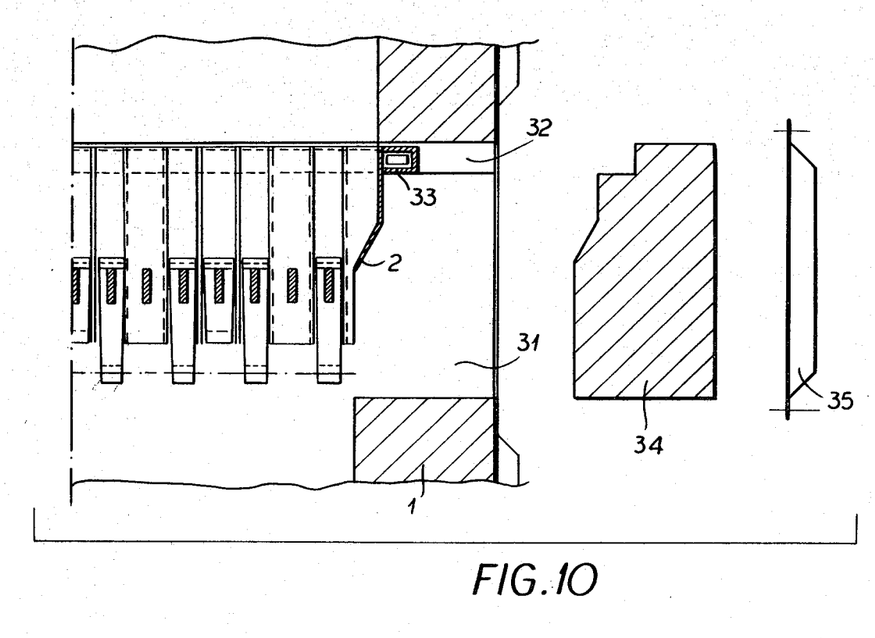
FIG. 10 is a partial cross section through a shaft with grates that can be slid in place laterally.

Instead of the modular construction of the shaft described above, the wall 1 of the shaft can be realized as a single unit and can exhibit window openings 31 in accordance with the example of FIG. 10, into which, the grates 2 are slidable in the shape of the already mentioned modules. In this module, the grates 2 consist of the fixed and movable grate rods described with reference to FIG. 2a and 3b respectively, and the associated devices for the lifting motion of the grate rods movable out of the plane of the grate.

The grates 2 realized as modules shown in FIG. 10 are retained in mortise-shaped recesses 32 of the later wall shaft by means of a support device 33.

The window opening 31 in the shaft wall 1 is closable by means of a filler piece 34 adapted to the window opening, which consists of the same material as shaft wall 1. In additon, a cover plate 35 is provided which, after insertion of filler piece 34 into window opening 31 is, bblted together with shaft wall 1 and thus secures the position of filler piece 34 in the inserted state. It can be seen that an interchange of the grates constructed as modules is possible with little exertion where the construction of the shaft is in accordance with FIG. 10.

We claim:

1. A method of producing an expanded aluminosilicate, comprising the steps of:
   (a) forming an aluminosilicate into substantially uniform pellets of a particle size of substantially 6 to 26 mm;
   (b) drying the pellets formed in step (a) at a temperature up to about 360° C.;
   (c) depositing swellable pellets of expandable aluminosilicate as produced in step (b) onto the uppermost grate of a vertical granule-expansion column having a multiplicity of horizontal bar grates with uniformly distributed movable bars of each bar grate being shiftable out of a grate plane thereof, the pellets being deposited upon said upper most grate and being formed into a layer of unifrom thickness over the enitre horizontal area of said upper most grate, a corresponding layer of pellets being provided with uniform thickness on each of the other grate of said column;
   (d) providing each of said layers so that a free space is ensured above each layer and below the next-higher grate, and below each grate and above the next underlying layer during a respective residence time for each layer on each grate;
   (e) upon conclusion of each residence time, moving the movable bars of each grate out oof the respective grate plane thereof to cause the pellets of the alyer of the respective grate to trickle downwardly between the bars thereof in a uniform cascade over the entire cross section of the column and reform a new layer which is of uniform across said cross section on the next underlying grate;
   (f) laterally introducing through certain of said free spaces to one side of each of grates of a set thereof at an upper protion of said column, a preheating gas and casuing said preheating gas to transverse each grate of said set in a direction perpendicular to the layer thereon, and withdrawing said gas from said free spaces on the opposite side of each grate of said set, thereby preheating the pellets to a temperature below a swelling temperatue of said pellets;
   (g) laterally introducing through at least one other of said free spaces to one side of at least one other of said grates below said upper portion of said column, an expanding gas at a temperature sufficient to swell the preheated pellets, causing said expanding gas to traverse each said other garte in a direction perpendicular to the layer thereon, and withdrawing said expanding gas from a free space on the opposite side of each said other grate, thereby expanding the pellets; and
   (h) discharging expanded pellets at a bottom portion of said column.

2. The method defined in claim 1 wherein said pellets are ceramically bonded and are rendered preswellable by retaining a reserve of a substance capable of generating and expanding gas in said pellets in an amount sufficient to effect a volume increase of substantially 26 to 40% thereof.

3. The method defined in claim 1 wherein said pellets are cermaically bonded and are rendered preswellable by retaining a reserve of a substance capable of generating and expanding gas in said pellets in ana mount sufficient to effect a volume increase of substantially 40 to 70%.

4. The method defined in claim 1, further comprising shielding said uppermost grate against penetration by hot gas from a location below said uppermost grate during at least the residence time of said layers on the grates of said upper portion.

5. The method defined in claim 1 wherein the layers on at least some of said grate are traversed by gas in one direction during some of the residence times while layers on said grates are traversed by gas in an opposite direction during other residence times of said layers.

6. The method defined in claim 5 wherein layers on successive grates are alternately traversed by gas in opposite directions.

7. The method defined in claim 1 wherein said preheating gas is selected from the group which consists of neutral and reducing gases and said expanding gas is an oxidizing gas.

8. The method defined in claim 1 wherein said pellets are for the production of plate-shaped sutructral elements and are formed into said layers in quantities so that said layers have thickness of said elements.

9. The method defined in claim 1, further comprising the step of at least intermittently passing gas through each layer upwardly at a velocity sufficient to effect loosening of the pellets thereof.

10. The method defined in claim 1, further comprising a step of shielding the layers of said upper portion from said expanding gas during the expanding of said plates in step (g).

* * * * *